(12) United States Patent
Yeh (10) Patent No.: US 7,989,970 B2
(45) Date of Patent: Aug. 2, 2011

(54) BICYCLE-SEAT POWER GENERATION DEVICE

(76) Inventor: Ming-Hsiang Yeh, Taipei (TW)

( * ) Notice: Subject to any disclaimer, the term of this patent is extended or adjusted under 35 U.S.C. 154(b) by 579 days.

(21) Appl. No.: 12/219,003

(22) Filed: Jul. 15, 2008

(65) Prior Publication Data

US 2010/0013241 A1  Jan. 21, 2010

(51) Int. Cl.
*F02B 63/04* (2006.01)
(52) U.S. Cl. .................. 290/1 C; 290/1 R; 180/205
(58) Field of Classification Search .............. 290/1 R, 290/1 A, 1 C; 180/205, 206
See application file for complete search history.

(56) References Cited

U.S. PATENT DOCUMENTS

| | | | | |
|---|---|---|---|---|
| 3,573,479 A | * | 4/1971 | Rieth | 290/1 E |
| 3,981,204 A | * | 9/1976 | Starbard | 74/34 |
| 4,032,829 A | * | 6/1977 | Schenavar | 322/3 |
| 4,078,438 A | * | 3/1978 | Starbard | 74/34 |
| 4,387,781 A | * | 6/1983 | Ezell et al. | 180/65.22 |
| 5,259,259 A | * | 11/1993 | Inokuchi et al. | 74/131 |
| 7,304,398 B1 | * | 12/2007 | Kim et al. | 290/1 E |
| 7,361,999 B2 | * | 4/2008 | Yeh | 290/1 R |
| 7,408,266 B2 | * | 8/2008 | Yeh | 290/1 C |
| 7,525,204 B2 | * | 4/2009 | Kitamura | 290/1 R |
| 2007/0090703 A1 | * | 4/2007 | Yeh | 310/83 |

* cited by examiner

*Primary Examiner* — Nicholas Ponomarenko
(74) *Attorney, Agent, or Firm* — Rosenberg, Klein & Lee (57) ABSTRACT

A bicycle-seat power generation device includes a seat, a frame, an electrical generator, an electrical generation module, a mount, and a cushioning unit. The electrical generator includes a spindle gear. The electrical generation module includes a toothed rack and a transmission gear train. The toothed rack has an upper end abutting against an underside of the seat. The transmission gear train has an end engaging the toothed rack and another end engaging the spindle gear of the electrical generator. The mount accommodates the electrical generation module and the electrical generator therein in order to have the electrical generation module and the electrical generator coupled between the seat and the frame. The cushioning unit is also coupled between the seat and the frame and is fixed together with the mount in order to drive the toothed rack of the electrical generation module for effecting power generation. As such, a bicycle-seat power generation device that features simultaneous shock absorption and power generation is provided.

13 Claims, 7 Drawing Sheets

BICYCLE-SEAT POWER GENERATION DEVICE

FIELD OF THE INVENTION

The present invention relates to a bicycle-seat power generation device, and in particular to a combined assembly of a seat, a frame, an electrical generator, an electrical generation module, a mount, and a cushioning unit, wherein the mount accommodates the electrical generator and the electrical generation module for coupling between a bicycle seat and a bicycle frame to form interconnection with the cushioning unit so that shock absorption and power generation can be effected at the same time to thereby be applicable to a bicycle seat or the like for power generation.

BACKGROUND OF THE INVENTION

The currently available transportation measures include automobiles, motorcycles, and bicycles. The motorcycles and the automobiles are provided with a battery for powering electronic components, but the bicycles are not provided with such electrical facility and are usually operated by manually pedaling to effect movement to the destination. In the daytime, when a good eyesight view is available, there is rarely safety problem happening to a bicycle rider, but in the nighttime, when the eyesight is poor, the bicycle rider encounters severe safety problems. To protect the safety of the bicycle rider, some market available bicycles are provided with light reflectors or flashing lights mounted to for example a seat or wheels of the bicycle to make the bicycle rider more visible to automobile drivers. To energize the light sources mounted to the bicycle, a battery or a power generation device that supplies electrical power must be provided on the bicycle. Thus, currently, bicycle hub with power generator is now available in the market.

Such a known structure is effective in generating power by the bicycle itself, but it requires a great number of parts, has a complicated process of assembling, and has high costs of parts and manufacturing. Further, such a known structure requires the effort provided by a bicycle rider, for the rider must pedal the bicycle to a preset speed before the power generation device can be started to generate power. This is a major drawback of the conventional device. Further, with the global popularization of exercising and environmental protection, more and more people use bicycles as a transportation means or a leisure activity. And more and more people carry a portable electronic device, such as a mobile phone or an MP3 player during their trips to for example the offices or when they are doing exercises, but these electronic devices require constant charging. This is quite troublesome for people staying outdoors or doing outdoor activities.

In view of such problems, the present invention is aimed to provide a solution to such problems.

SUMMARY OF THE INVENTION

A primary objective of the present invention is to provide a bicycle-seat power generation device, featuring a combined assembly of a seat, a frame, an electrical generator, an electrical generation module, a mount, and a cushioning unit, wherein the mount accommodates the electrical generator and the electrical generation module for coupling between a bicycle seat and a bicycle frame to form interconnection with the cushioning unit so that the vibration occurring to a bicycle due to altitude difference on the road surface is used to generate electrical power, whereby shock absorption and power generation can be effected at the same time to thereby enhance the overall practicability.

Another objective of the present invention is to provide a bicycle-seat power generation device featuring a combined assembly of a seat, a frame, an electrical generator, an electrical generation module, a mount, and a cushioning unit, wherein the electrical generator has a power output end that is connectable with a power accumulation unit, a boost/buck transformer, a charger and the likes to supply electrical power to an external electronic device, such as head light or a rear-side warning light or alternatively, the power output end of the electrical generator is further provided with a charging seat or is connectable to an external charging seat to provide instantaneous charging to a portable electronic device, such as a mobile or an MP3 player, to thus improve the overall practicability and convenience.

To realize the above objectives, the present invention comprises a seat, a frame, an electrical generator, an electrical generation module, a mount, and a cushioning unit. The electrical generator comprises a spindle gear. The electrical generation module comprises a toothed rack and a transmission gear train. The toothed rack has an upper end abutting against an underside of the seat. The transmission gear train has an end engaging the toothed rack and another end engaging the spindle gear of the electrical generator. The mount accommodates the electrical generation module and the electrical generator therein in order to have the electrical generation module and the electrical generator coupled between the seat and the frame. The cushioning unit is also coupled between the seat and the frame and is fixed together with the mount in order to drive the toothed rack of the electrical generation module for effecting power generation. As such, a bicycle-seat power generation device that features simultaneous shock absorption and power generation is provided.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 1:
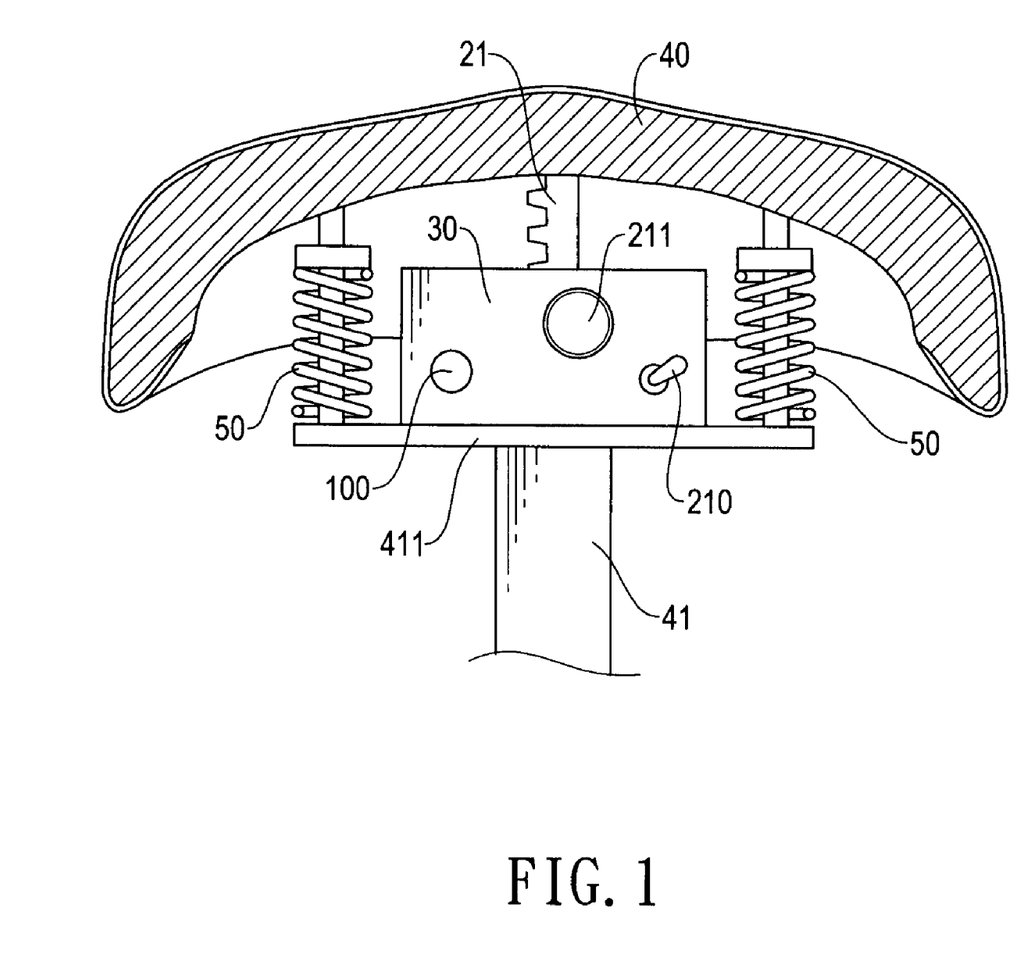
FIG. 1 is a cross-sectional view of a bicycle-seat power generation device in accordance with an embodiment of the present invention.
Figure 2:
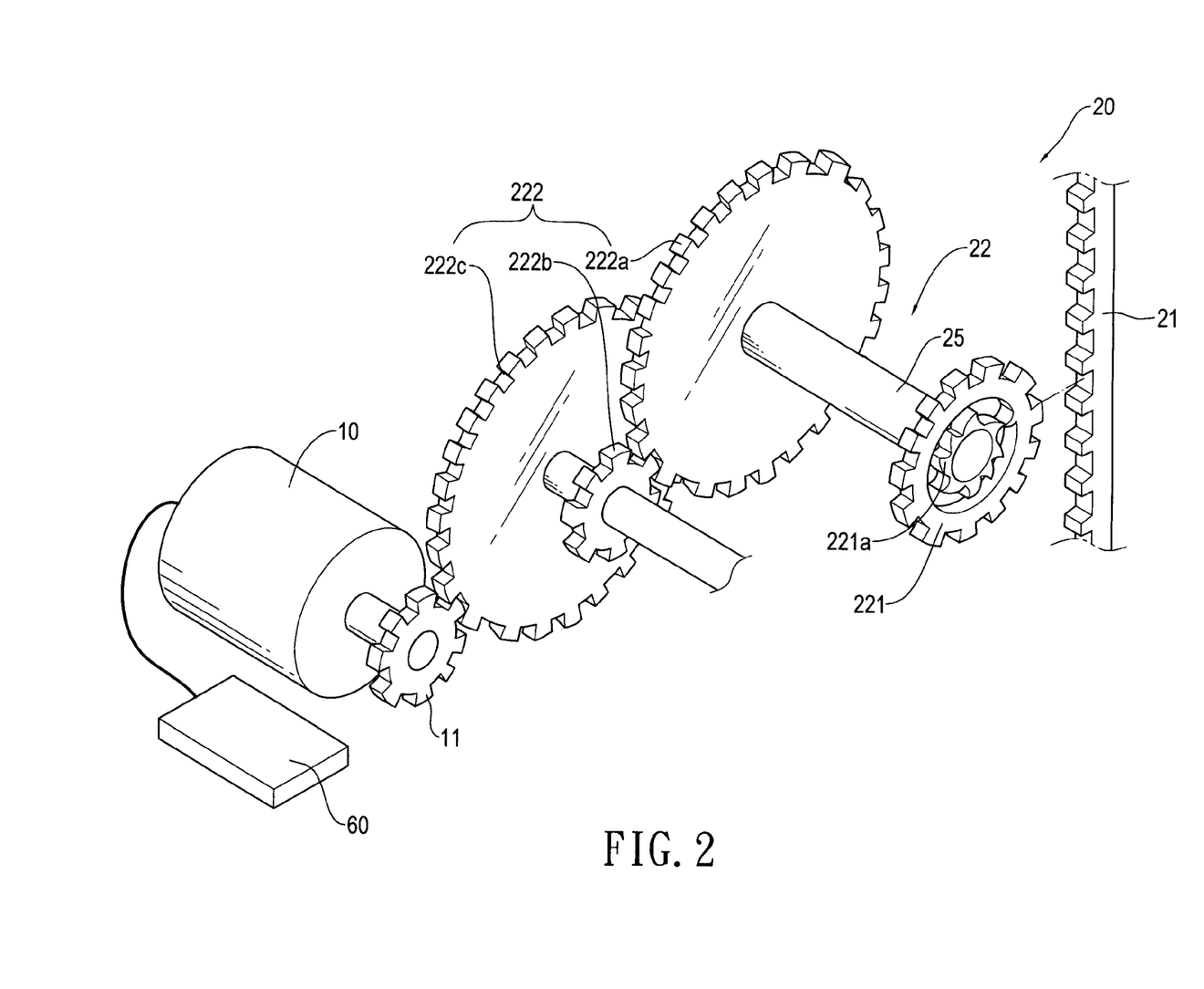
FIG. 2 is a schematic view illustrating interconnection between an electrical generator and an electrical generation module of the bicycle-seat power generation deice in accordance with an embodiment of the present invention.
Figure 3:
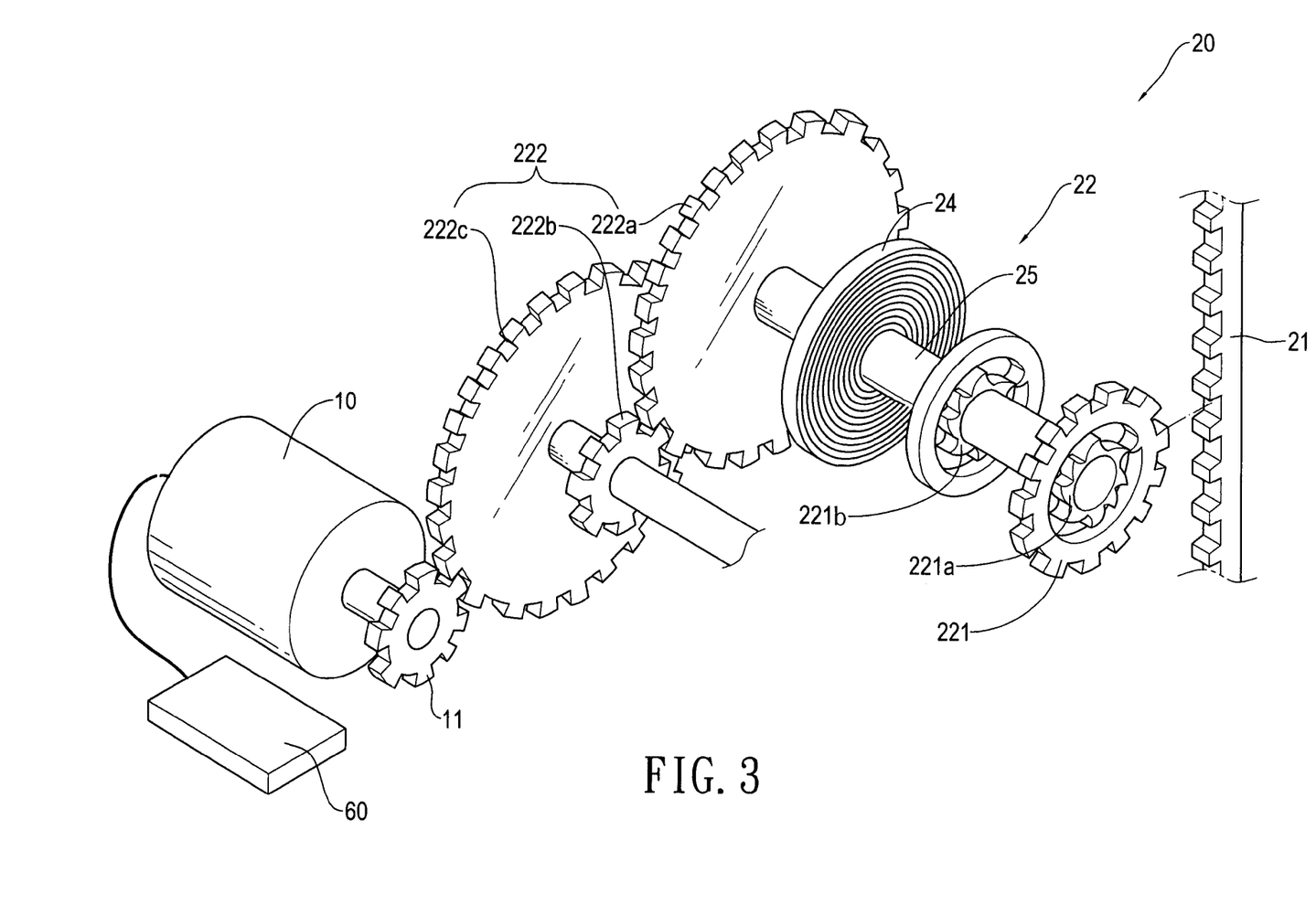
FIG. 3 is a schematic view illustrating interconnection between an electrical generator and an electrical generation module of the bicycle-seat power generation deice in accordance with another embodiment of the present invention.

With reference to the drawings and in particular to FIGS. 1-3, a bicycle-seat power generation device constructed in accordance with the present invention comprises a seat 40, a frame 41, an electrical generator 10, an electrical generation module 20, a mount 30, and a cushioning unit 50. The seat 40 is a saddle of a bicycle. The frame 41 is a bicycle frame arranged below the seat 40. The electrical generator 10 comprises a spindle gear 11. The electrical generation module 20 comprises a toothed rack 21 and a transmission gear train 22. The toothed rack 21 has an upper end abutting against an underside of the seat 40. The transmission gear train 22 engages, at one side thereof, the toothed rack 21 and also engages, at another side thereof, the spindle gear 11 of the electrical generator 10. In a practical application, the transmission gear train 22 is comprised of a driving gear 221 and an interconnection gear train 222. The interconnection gear train 222 comprises a plurality of gears, which, in the embodiment illustrated, include a first gear 222a, a second gear 222b, and a third gear 222c, which are inter-mating each other and are in operative interconnection with each other to provide a desired gear ratio for enhancing power generation performance. The driving gear 221 mates the toothed rack 21 and one gear of the interconnection gear train 222 (namely, the first gear 222a) is shaft-coupled to and in operative interconnection with the driving gear 221. Another gear of the interconnection gear train 222 (namely, the third gear 222c) mates the spindle gear 11 of the electrical generator 10. The mount 30 functions to receive the electrical generation module 20 and the electrical generator 10 to allow the electrical generator 10 and the electrical generation module 20 to be coupled between the seat 40 and the frame 41 of the bicycle. The cushioning unit 50 is coupled between the seat 40 and the frame 41 of the bicycle and is fixed together with the mount 30 for driving the toothed rack 21 of the electrical generation module 20 to generate electrical power. As such, a bicycle-seat power generation device that features cushioning and power generation is provided.

Figure 5:
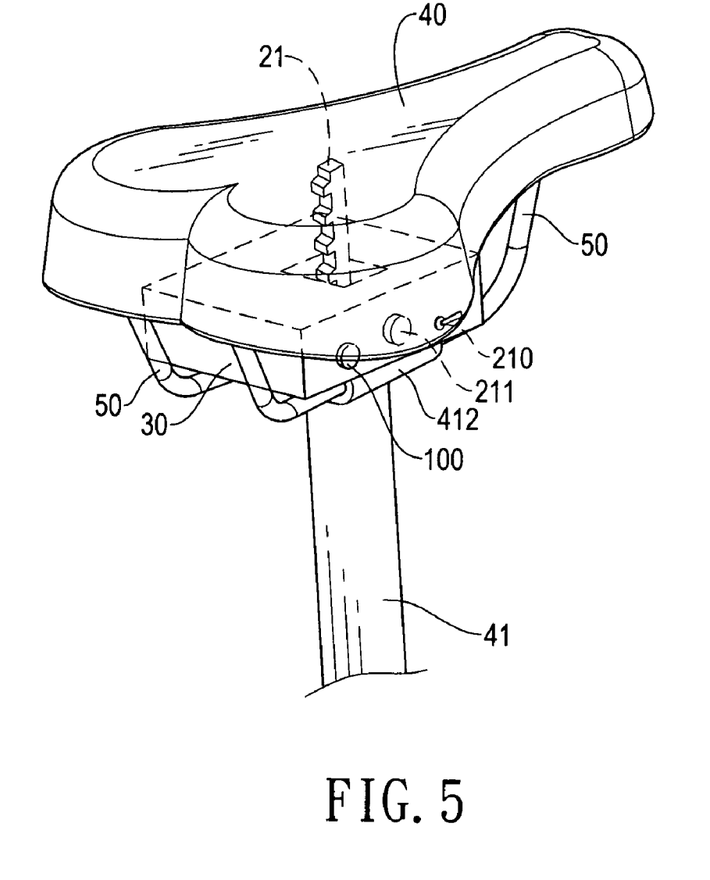
FIG. 5 is a perspective view illustrating a bicycle-seat power generation device in accordance with another embodiment of the present invention.

The mount 30 can be embodied as a case having a top forming an opening. The electrical generator 10 and the electrical generation module 20 are accommodated in the case of the mount 30. The upper end of the toothed rack 21 of the electrical generation module 20 projects through the opening in the case of the mount 30 to abut against the underside of the seat 40 so that the toothed rack 21 can be operated by a downward force applied by the seat 40. The frame 41 can further comprise a board 411 for fixing the mount 30 and the cushioning unit 50 between the seat 40 and the frame 41 of the bicycle, wherein the fixing can be realized by means of threading, fitting, adhesives, and inlaying to have the bottoms of the mount 30 and the cushioning unit 50 attached to the board 411 that is arranged on the frame 41 and making the cushioning unit 50 and the mount 30 fixed together. A top of the mount 30 is spaced from the underside of the seat 40 by a distance to form a gap that allows the upper end of the toothed rack 21 to project beyond the top of the mount 30 for abutting against the underside of the seat 40. The cushioning unit 50 can be for example one or more shock absorbers (which can be embodied as springs as shown in FIG. 1) or other resilient elements (as shown in FIG. 5), which when absorbing and reducing shocks and vibration, induces vertical reciprocal movement, causing the mount 30 that is fixed, together with the cushioning unit 50, to the board 411 of the frame 41 to move, thereby driving vertical movement of the toothed rack 21 that has one end fixed to the mount 30.

Also referring to FIGS. 2 and 3, which are schematic views illustrating two types of interconnection of the electrical generator 10 and the electrical generation module 20 for power generation, in FIGS. 2 and 3, the driving gear 221 of the transmission gear train 22 can be a one-way gear (which in a practical application can include a ratchet 221a arranged in a ring-like configuration of the gear to impose a single-directional rotation). In FIG. 2, a shaft 25 is arranged between the driving gear 221 and the first gear 222a of the interconnection gear train 222 for realizing shaft-coupling and thus operative interconnection therebetween. With the assumption that only when the toothed rack 21 moves upward, the driving gear 221 can take rotational movement for driving the first gear 222a, the second gear 222b, and the third gear 222c of the interconnection gear train 222 so as to allow the electrical generator 10 to generate electrical power by means of the third gear 222c driving the spindle gear 11 of the electrical generator 10. When the toothed rack 21 is moved downward, the driving gear 221 is set in an idle rotation condition thereby a single-way power generation can be realized. With the above description, it is apparent that the present embodiment has a simple structure and can be easily practiced, but the toothed rack 21 has to be subjected to vibration in order to do vertical movement for causing power generation.

Further, as shown in FIG. 3, between the gear (namely the first gear 222a) of the interconnection gear train 222 that is in shaft-coupling with the driving gear 221 and the driving gear 221, a spring buffering device 24 is further included to effect shaft-coupling and interconnection. In a practical application, an end of the spring buffering device 24 is fixed to the shaft 25 and an end of the shaft 25 is fixed to the driving gear 221 to form shaft-coupling and interconnection between the spring buffering device 24 and the driving gear 221. Another end of the spring buffering device 24 is coupled to another shaft to form shaft-coupling with the Third gear 222c for effecting interconnection therebetween. Further, a ratchet 221b is arranged on a portion of the shaft 25 between the spring buffering device 24 and the driving gear 221 and a mounting seat 251 (which can be fixed inside the mount 30) is arranged around an outer circumference of the ratchet 221b to limit the rotation direction of the shaft 25 thereby preventing the spring buffering device 24 from rotating reversely. With the assumption that only taking an upward movement can the toothed rack 21 drives the rotation of the driving gear 221, by means of the interconnection realized by the shaft 25, the spring buffering device 24 is caused to rotate and at the same time drives the first gear 222a, the second gear 222b, and the third gear 222c of the interconnection gear train 222 so as to allow the electrical generator 10 to generate electrical power by means of the third gear 222c driving the spindle gear 11 of the electrical generator 10. When the toothed rack 21 is moved downward, although the driving gear 221 is in an idle rotation condition, yet the spring buffering device 24 that has one end fixed to the shaft 25, due to having been previously driven by the driving gear 221 to make the spring compressed and further due to another end of the spring buffering device 24 set in shaft-coupling with the First gear 222a of the interconnection gear train 222, can cause rotation of the first gear 222a by means of the spring force of the spring buffering device 24 thereby inducing power generation, and thus smooth and continuous power generation can be realized as compared to the embodiment of FIG. 2.

Further, referring to FIGS. 1-4, the electrical generator 10 is further provided with a switch 100 for controlling ON/OFF state of the electrical generator 10. The electrical generation module 20 is further provided with a clutch, which comprises a clutch lever 210 for controlling engagement between the toothed rack 21 and the driving gear 221. The electrical generation module 20 is further provided with an adjustment knob 211 for adjusting the vertical position of the toothed rack 21 to facilitate installation below the seat 40 of different models of bicycle. Since the road on which the bicycle is ridden may have various surface irregularity, the impact force acting on the bicycle can be different so that a spring buffering device 24 (as shown in FIG. 3) arranged between the first gear 222a of the interconnection gear train 222 and the driving gear 221 can function to absorb and buffer kinetic energy of a large impact and also to accumulate small fractions of kinetic energy induced by small impacts to subject the electrical generator 10 with smooth and stable kinetic energy. The switch 100, the clutch lever 210 and the adjustment knob 211 can be mounted on the case of the mount 30 to facilitate access and operation by a bicycle rider.

Further, a power output end of the electrical generator 10 can be further connected to a power accumulation unit 60 (such as storage battery) so that the power generated by the electrical generator 10 can be stored in the storage battery and the power so generated can be supplied to an external electronic device (such as a head light 42, a rear-side warning light 43). The power accumulation unit 60 can be further and electrically connected to a control switch 44. The control switch 44 can be mounted at a central portion of a handlebar of the bicycle, whereby electrical connection with the electronic devices that are externally mounted to the bicycle (such as the head light 42 and the rear-side warning light 43) can be done through the control switch 44. Further, the power output end of the electrical generator 10 can be further connected to a boost/buck transformer (not shown) or a charger, or alternatively, the power output end of the electrical generator 10 is connected with a charging seat (not shown) for instantaneous charging operation for a portable electronic device, such as a mobile phone or an MP3 player. Due to the electrical connection between the electrical generator 10 and the electronic devices (such as a head light 42, a rear-side warning light 43), the external electronic devices can be simply controlled by means of the control switch 44, such as turning on the head light 42 or the rear-side warning light 43 to effect lighting and warning. Conclusively, although only one set of electrical generation module 20 is provided in the present embodiment, with the electrical generation module 20 comprised of a toothed rack 21 and a transmission gear train 22 and the transmission gear train 22 further comprised of a driving gear 221 and a interconnection gear train 222, yet in a practical application, it can be done in accordance with the needs that more than one set of electrical generation module 20 is included in the bicycle-seat power generation device of the present invention and a modularized design can be taken to allow multiple sets of electrical generation module 20 connected together in a serial form or parallel form or combined serial and parallel form; the number of the electrical generator 10 can be correspondingly more than one. Further, even if there is only one set of electrical generation module 20 included in the bicycle-seat power generation device of the present invention, the toothed rack 21 and the transmission gear train 22 that are included in the electrical generation module 20 can be of more than one set of combination thereof in accordance with the needs. When there is more than one toothed rack 21 arranged below the seat 40 and the transmission gear train 22 correspondingly comprises more than one driving gear 221 (with those more than one driving gear 221 mounted together to the shaft 25 in a parallel arrangement), the capability of the electrical generation module 20 sustaining the impact induced by vibration of the seat 40 of the bicycle can be enhanced, for example, ridding a bicycle on an uneven road or the weight of a rider, both being causes to induce impacts of various magnitudes, and thus protection of the bicycle-seat power generation of the present invention can be improved. Further, in accordance with a practical need of power generation, the interconnection gear train 222 of the transmission gear train 22 is comprised of three gears (the illustrated embodiment illustratively using three gears to provide a gear ratio desired for the interconnection gear train 222) to provide a desired gear ratio in order to enhance the performance of the electrical generator 10.

Figure 4:
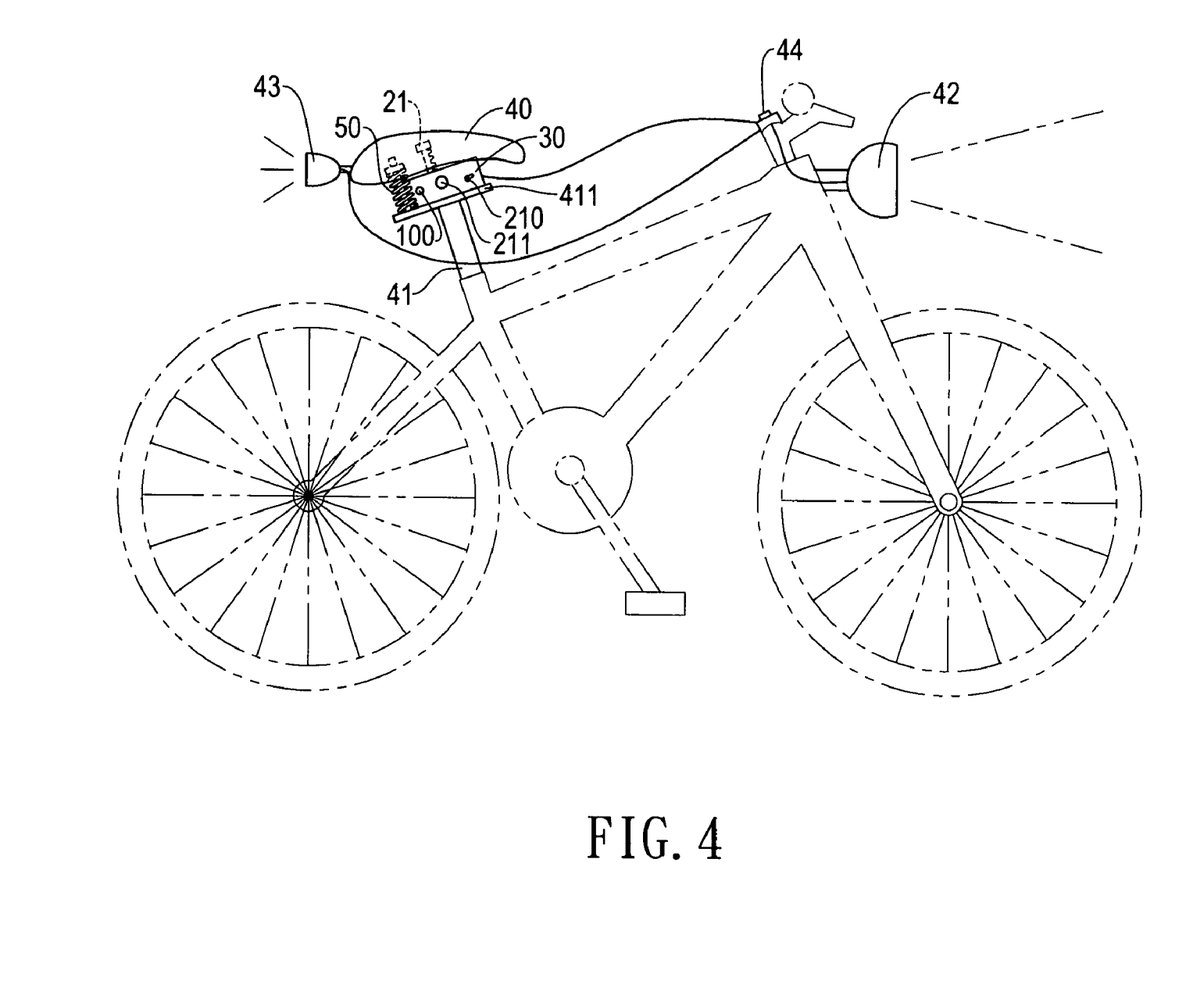
FIG. 4 is a schematic view illustrating the bicycle-seat power generation device of the present invention mounted to a bicycle.

Referring to FIG. 14 again, the present invention features a combined assembly of a electrical generator 10, a electrical generation module 20, a mount 30, a seat 40, a frame 41, and a cushioning unit 50, wherein the mount 30 functions to accommodate the electrical generator 10 and the electrical generation module 20 and for mounting between the seat 40 and the frame 41 of a bicycle to be fixed together with the cushioning unit 50 that is similarly coupled between the seat 40 and the frame 41 of the bicycle so that when the bicycle encounters a recess or surface irregularity, the vibration induced on the bicycle due to the altitude difference of the road surface can be absorbed by the cushioning unit 50 (such as a shock absorber) arranged between the seat 40 and the frame 41 of the bicycle to provide buffering effect that eliminates the rider's feeling of jolt. Further, the seat 40, when subjected to vibration, downward depress the toothed rack 21 of the electrical generation module 20 that abuts against the underside of the seat 40, making the 21 to take vertical movement and thus causing the electrical generation module 20 to drive the electrical generator 10 to generate electrical power. With the cushioning unit 50 and the mount 30 together fixed between the seat 40 and the frame 41, at the same time when the cushioning unit 50 (such as a shock absorber) is effecting absorption and buffering of the vibration, the cushioning unit 50 itself generates reciprocal movement for a sustained period of time, causing the mount 30 to move up and down with the toothed rack 21, whereby by means of the interconnection between the electrical generation module 20 and the electrical generator 10, the electrical generator 10 is driven to generate power so that power generation can be performed at the same time when shock or vibration is absorbed. Further, with the power output end of the electrical generator 10 further connected to a power accumulation unit 60, a boost/buck transformer, or a charger, or alternatively, the power output end of the electrical generator 10 being further provided with a charging seat or externally connected with a charging seat, external electronic device, such as a head light 42, a rear-side warning light 43, can be provided with electrical power or recharging of a mobile phone or an MP3 player can be realized to enhance the convenience of use. Further, the preset invention adopts a mechanically driven power generation structure, which is environmentally conservative. Further, with a spring buffering device 24 arranged between the driving gear 221 and the interconnection gear train 222 of the transmission gear train 22 of the electrical generation module 20, continuous and smooth power generation can be realized. Conclusively, the present invention uses the gravitational difference caused by the vibration induced due to the riding of a bicycle to generate electrical power, which does not impose any undesired load to the bicycle rider and can carry out power generation without causing any attention of the rider and thus provides practical values of excellent convenience of use, environmental conversation, and conformableness of use.

Figure 6:
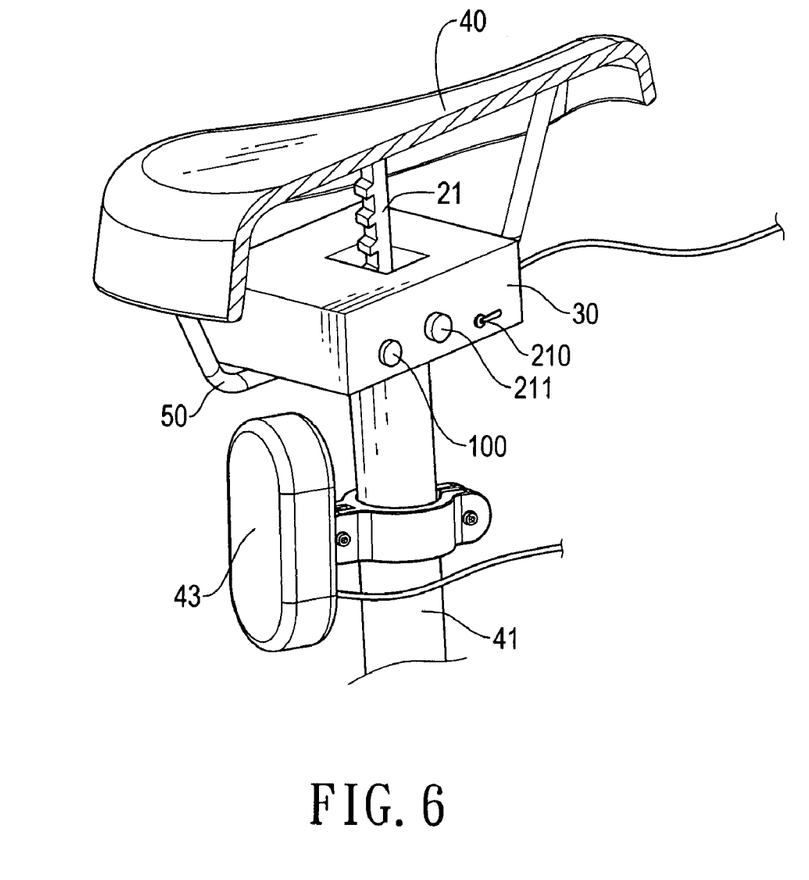
FIG. 6 is a perspective view, partially broken, illustrating the bicycle-seat power generation device in accordance with said another embodiment of the present invention.
Figure 7:
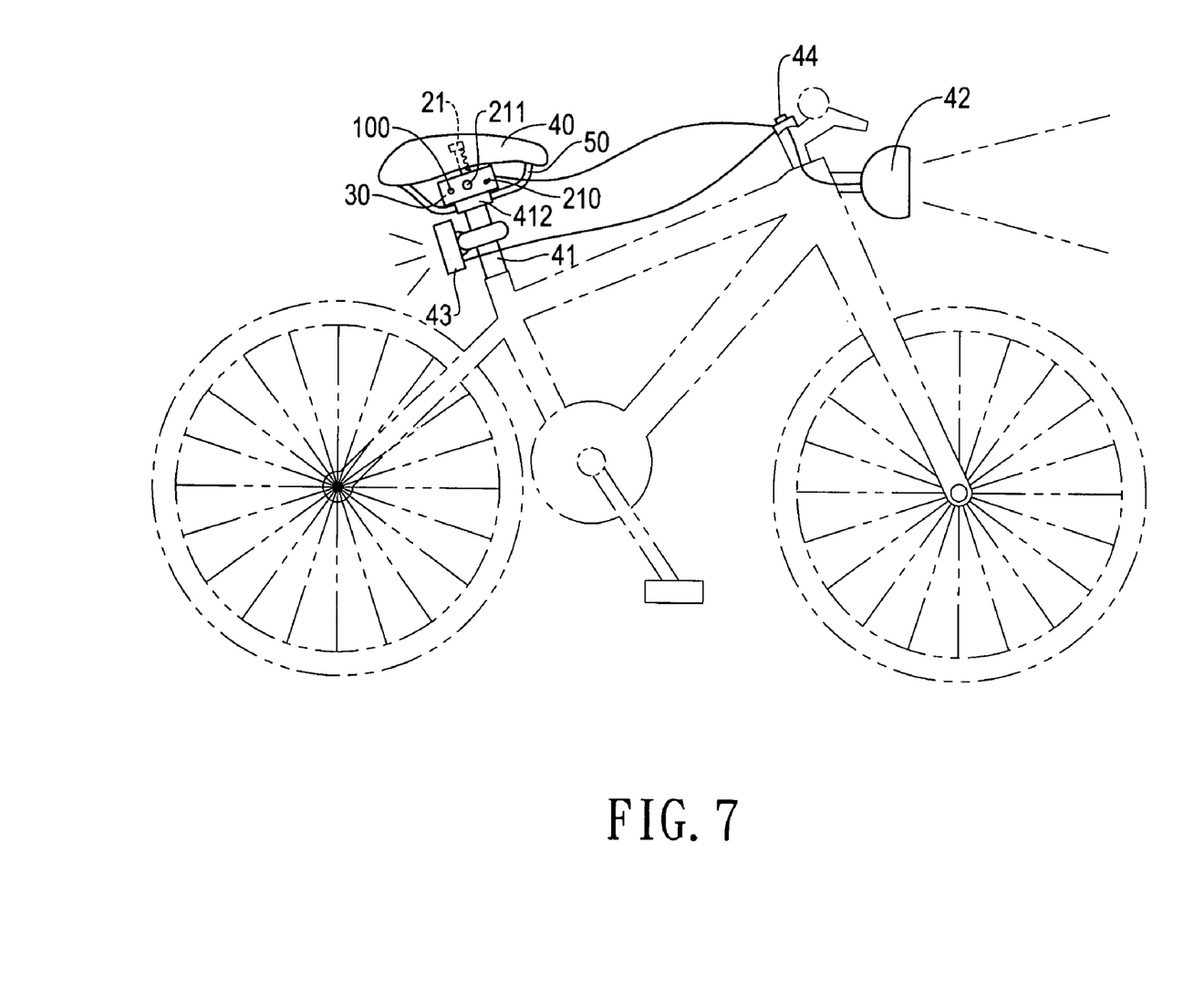
FIG. 7 is a schematic view illustrating the bicycle-seat power generation device of said another embodiment of the present invention mounted to a bicycle.

Reference is now made to FIGS. 5-7, which show another embodiment of the present invention, the present embodiment is applied to the seat 40 of an off-road bicycle, wherein the cushioning unit 50 takes the form of a resilient bent tube to achieve the purpose of alleviating vibration of the seat 40. In the present embodiment, two resilient bent tubes are provided below the seat 40 of the bicycle and the frame 41 is provided a top thereof with two fasteners 412 for securing the seat 40 to the frame 41. The mount 30 (which contains therein the electrical generator 10 and the electrical generation module 20, see FIGS. 2 and 3) is arranged between the seat 40 and the frame 41 and the arrangement can be done by straddling above the two resilient bent tubes or by providing additional fastener (not shown) on the mount 30 (such as the bottom thereof) to fasten the cushioning unit 50 that is in the form of resilient bent tube. Further, the toothed rack 21 extends out of the mount 30 (which can be in the form of a case) to abut against the underside of the seat 40. Further, in a practical application, other means can be adopted to have the mount 30 and the seat 50 fixed and moving together. In use, the seat 40 is subjected to the gravitational difference caused by the vibration induced in the operation of the bicycle to cause the movement of the cushioning unit 50 and the toothed rack 21. The vertical movement of the toothed rack 21 that is driven by the cushioning unit 50 that functions to absorb shock and vibration and induce reciprocal movement for driving electrical generation in the same way identical to what was described above and will not be described again effect simultaneously shock absorption and power generation. The present embodiment is similar to the previous one in that the power that is generated can be supplied to an external electronic device, such as a head light 42 and a rear-side warning light 43 mounted to the bicycle. And, once again, the present embodiment possesses the values of convenience of use, environmental protection, and comfortableness of use.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A bicycle-seat power generation device, comprising:
   a seat, which is a saddle of a bicycle;
   a frame, which is a bicycle frame arranged below the bicycle saddle;
   an electrical generator, comprising a spindle gear;
   an electrical generation module comprising a toothed rack and a transmission gear train, the toothed rack having an upper end abutting against an underside of the seat, the transmission gear train having an end engaging the toothed rack and another end engaging the spindle gear of the electrical generator;
   a mount accommodating the electrical generation module and the electrical generator therein in order to have the electrical generation module and the electrical generator coupled between the seat and the frame; and
   a cushioning unit coupled between the seat and the frame and is fixed together with the mount in order to drive the toothed rack of the electrical generation module for effecting power generation.

2. The bicycle-seat power generation device as claimed in claim 1, wherein the frame further comprises a board for coupling the mount and the cushioning unit between the seat and the frame to have the cushioning unit and the mount fixed together.

3. The bicycle-seat power generation device as claimed in claim 1, wherein the transmission gear train comprises a driving gear and a interconnection gear train, the driving gear comprising a one-way gear, the driving gear mating the toothed rack, the interconnection gear train being comprised of a plurality of gears to provide a gear ratio, one of the gears of the interconnection gear train being in shaft-coupling with the driving gear, another gear of the interconnection gear train mating the spindle gear of the electrical generator.

4. The bicycle-seat power generation device as claimed in claim 3 further comprising a spring buffering device arranged between the gear of the interconnection gear train that is in shaft-coupling with the driving gear and the driving gear to effect shaft coupling and operative interconnection.

5. The bicycle-seat power generation device as claimed in claim 3 further comprising a spring buffering device arranged between the gear of the interconnection gear train that is in shaft-coupling with the driving gear and the driving gear, a shaft between the spring buffering device and the driving gear being provided with a ratchet, which is externally provided with a mounting seat for limiting rotational direction of the shaft and preventing the spring buffering device from rotating reversely.

6. The bicycle-seat power generation device as claimed in claim 1, wherein the cushioning unit takes a form of resilient bent tube.

7. The bicycle-seat power generation device as claimed in claim 1, wherein the electrical generation module further comprises a clutch that is comprised of a clutch lever for controlling engagement between the toothed rack and the gears.

8. The bicycle-seat power generation device as claimed in claim 1, wherein the electrical generation module further comprises an adjustment knob for adjusting vertical position of the toothed rack to facilitate installation.

9. The bicycle-seat power generation device as claimed in claim 1, wherein the electrical generator further comprises a switch for controlling ON/OFF state of the electrical generator.

10. The bicycle-seat power generation device as claimed in claim 1, wherein the electrical generator has a power output end connected to a power accumulation unit.

11. The bicycle-seat power generation device as claimed in claim 1, wherein the electrical generator has a power output end connected to a boost/buck transformer.

12. The bicycle-seat power generation device as claimed in claim 1, wherein the electrical generator has a power output end connected to a charger.

13. The bicycle-seat power generation device as claimed in claim 1, wherein the electrical generator has a power output end connected to a charging seat.

* * * * *